US012604356B2

(12) United States Patent
Matsumura et al.

(10) Patent No.: US 12,604,356 B2
(45) Date of Patent: Apr. 14, 2026

(54) TERMINAL, RADIO COMMUNICATION METHOD, AND BASE STATION FOR BEAM FAILURE RECOVERY (BFR)

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 411 days.

(21) Appl. No.: 17/924,515

(22) PCT Filed: May 15, 2020

(86) PCT No.: PCT/JP2020/019552
§ 371 (c)(1),
(2) Date: Nov. 10, 2022

(87) PCT Pub. No.: WO2021/229818
PCT Pub. Date: Nov. 18, 2021

(65) Prior Publication Data
US 2023/0189373 A1 Jun. 15, 2023

(51) Int. Cl.
*H04W 76/19* (2018.01)
*H04B 7/06* (2006.01)
*H04W 8/24* (2009.01)
(52) U.S. Cl.
CPC .................................... *H04W 76/19* (2018.02)
(58) Field of Classification Search
CPC ..... H04W 76/19; H04W 8/24; H04B 7/06964
See application file for complete search history.

(56) References Cited

U.S. PATENT DOCUMENTS

| | | | | |
|---|---|---|---|---|
| 2019/0190582 A1* | 6/2019 | Guo | ...................... | H04B 17/327 |
| 2019/0274098 A1* | 9/2019 | Cheng | ................... | H04L 5/0025 |
| 2021/0068162 A1* | 3/2021 | Agiwal | ................. | H04L 5/0048 |
| 2021/0315041 A1 | 10/2021 | Matsumura et al. | | |
| 2022/0311500 A1* | 9/2022 | Zheng | ................ | H04B 7/06964 |
| 2023/0131368 A1* | 4/2023 | Jang | ...................... | H04W 24/08 |
| | | | | 370/216 |

(Continued)

FOREIGN PATENT DOCUMENTS

WO 2020/031351 A1 2/2020

OTHER PUBLICATIONS

Office Action issued in Chinese Application No. 202080104723.X, mailed Jul. 23, 2024 (15 pages).

(Continued)

*Primary Examiner* — Harry H Kim
(74) *Attorney, Agent, or Firm* — Osha Bergman Watanabe & Burton LLP

(57) ABSTRACT

A terminal according to an aspect of the present disclosure includes: a control section that determines beam failure recovery (BFR) to be applied to a cell from physical random access channel (PRACH)-based BFR and medium access control control element (MAC CE)-based BFR on the basis of a radio resource control (RRC) parameter regarding MAC CE-based BFR; and a transmitting section that, when a BF is detected in the cell, performs transmission for the determined BFR. According to an aspect of the present disclosure, a BFR operation can be suitably performed in the case where MAC CE-based BFR is introduced.

4 Claims, 8 Drawing Sheets

(56) References Cited

U.S. PATENT DOCUMENTS

2023/0156819 A1*   5/2023  Agiwal  .............  H04W 74/0841
                                                      370/329

OTHER PUBLICATIONS

Samsung: "MAC Running CR for NR eMIMO"; 3GPP TSG-RAN WG2 Meeting #109 electronic, R2-2001706; Elbonia, Feb. 24-Mar. 6, 2020 (84 pages).

International Search Report issued in PCT/JP2020/019552 on Jul. 7, 2020 (3 pages).

Written Opinion of the International Searching Authority issued in PCT/JP2020/019552 on Jul. 7, 2020 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Japanese Patent Application No. 2022-522491, mailed on Feb. 13, 2024 (8 pages).

* cited by examiner

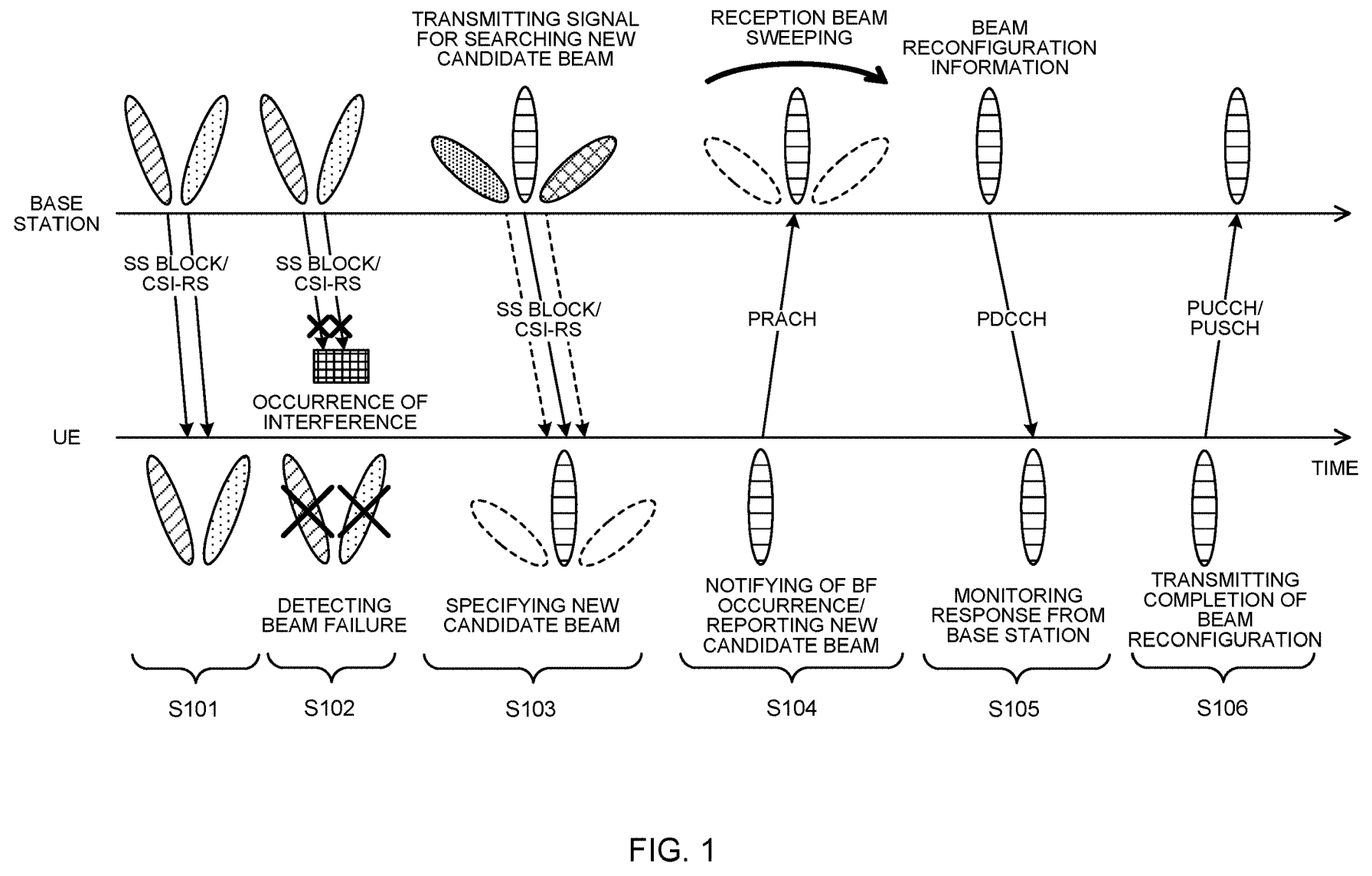

BASE
STATION

TIME

UE

TRANSMITTING SIGNAL
FOR SEARCHING NEW
CANDIDATE BEAM

BEAM
RECONFIGURATION
INFORMATION

RECEPTION BEAM
SWEEPING

SS BLOCK/
CSI-RS

SS BLOCK/
CSI-RS

SS BLOCK/
CSI-RS

PRACH

PDCCH

PUCCH/
PUSCH

OCCURRENCE OF
INTERFERENCE

S101

S102

S103

S104

S105

S106

DETECTING
BEAM FAILURE

SPECIFYING NEW
CANDIDATE BEAM

NOTIFYING OF BF
OCCURRENCE/
REPORTING NEW
CANDIDATE BEAM

MONITORING
RESPONSE FROM
BASE STATION

TRANSMITTING
COMPLETION OF
BEAM
RECONFIGURATION

FIG. 1

For the PCell or the PSCell, if UE is not configured *[Rel.16 RRC parameter]*, upon request from higher layers, the UE provides to higher layers the periodic CSI-RS configuration indexes and/or SS/PBCH block indexes from the set $\overline{q}_1$ and the corresponding L1-RSRP measurements that are larger than or equal to the $Q_{in,LR}$ threshold.

For the PCell the PSCell, or the SCell, if UE is configured *[Rel.16 RRC parameter]*, upon request from higher layers, the UE indicates to higher layers whether there is at least one periodic CSI-RS configuration index and/or SS/PBCH block index from the set $\overline{q}_1$ with corresponding L1-RSRP measurements that are larger than or equal to the $Q_{in,LR}$ threshold, and provides the periodic CSI-RS configuration indexes and/or SS/PBCH block indexes from the set $\overline{q}_1$ and the corresponding L1-RSRP measurements that are larger than or equal to the $Q_{in,LR}$ threshold, if any.

For the PCell or the PSCell, if UE is not configured *[Rel.16 RRC parameter]*, a UE can be provided a CORESET through a link to a search space set provided by *recoverySearchSpaceId,* as described in Clause 10.1, for monitoring PDCCH in the CORESET. If the UE is provided *recoverySearchSpaceId*, the UE does not expect to be provided another search space set for monitoring PDCCH in the CORESET associated with the search space set provided by *recoverySearchSpaceId.*

For the PCell or the PSCell, if UE is not configured *[Rel.16 RRC parameter]*, the UE can be provided, by *PRACH-ResourceDedicatedBFR*, a configuration for PRACH transmission as described in Clause 8.1. For PRACH transmission in slot $n$ and according to antenna port quasi co-location parameters associated with periodic CSI-RS resource configuration or with SS/PBCH block associated with index $q_{new}$ provided by higher layers [11, TS 38.321], the UE monitors PDCCH in a search space set provided by *recoverySearchSpaceId* for detection of a DCI format with CRC scrambled by C-RNTI or MCS-C-RNTI starting from slot $n+4$ within a window configured by *BeamFailureRecoveryConfig*. For PDCCH monitoring in a search space set provided by *recoverySearchSpaceId* and for corresponding PDSCH reception, the UE assumes the same antenna port quasi-collocation parameters as the ones associated with index $q_{new}$ until the UE receives by higher layers an activation for a TCI state or any of the parameters *tci-StatesPDCCH-ToAddList* and/or *tci-StatesPDCCH-ToReleaseList*. After the UE detects a DCI format with CRC scrambled by C-RNTI or MCS-C-RNTI in the search space set provided by *recoverySearchSpaceId*, the UE continues to monitor PDCCH candidates in the search space set provided by *recoverySearchSpaceId* until the UE receives a MAC CE activation command for a TCI state or *tci-StatesPDCCH-ToAddList* and/or *tci-StatesPDCCH-ToReleaseList*.

For the PCell or the PSCell, if UE is not configured *[Rel.16 RRC parameter]*, after 28 symbols from a last symbol of a first PDCCH reception in a search space set provided by *recoverySearchSpaceId* for which the UE detects a DCI format with CRC scrambled by C-RNTI or MCS-C-RNTI and until the UE receives an activation command for *PUCCH-SpatialRelationInfo* [11, TS 38.321] or is provided *PUCCH-SpatialRelationInfo* for PUCCH resource(s), the UE transmits a PUCCH on a same cell as the PRACH transmission using

- a same spatial filter as for the last PRACH transmission

- a power determined as described in Clause 7.2.1 with $q_u = 0$, $q_d = q_{new}$, and $l = 0$ For the PCell or the PSCell, if UE is not configured *[Rel.16 RRC parameter]*, after 28 symbols from a last symbol of a first PDCCH reception in a search space set provided by *recoverySearchSpaceId* where a UE detects a DCI format with CRC scrambled by C-RNTI or MCS-C-RNTI, the UE assumes same antenna port quasi-collocation parameters as the ones associated with index $q_{new}$ for PDCCH monitoring in a CORESET with index 0.

FIG. 3

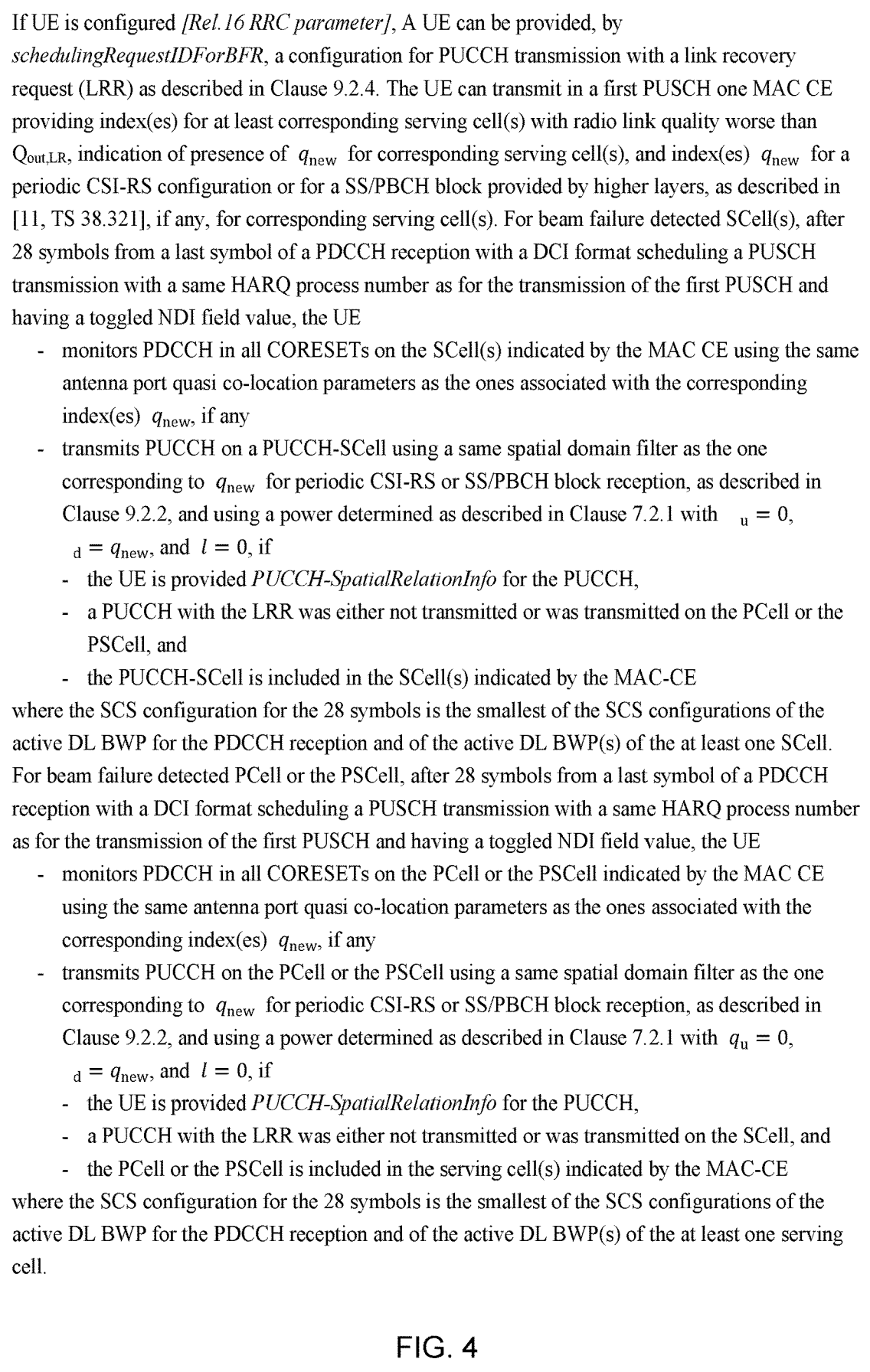

If UE is configured *[Rel. 16 RRC parameter]*, A UE can be provided, by *schedulingRequestIDForBFR*, a configuration for PUCCH transmission with a link recovery request (LRR) as described in Clause 9.2.4. The UE can transmit in a first PUSCH one MAC CE providing index(es) for at least corresponding serving cell(s) with radio link quality worse than $Q_{out,LR}$, indication of presence of $q_{new}$ for corresponding serving cell(s), and index(es) $q_{new}$ for a periodic CSI-RS configuration or for a SS/PBCH block provided by higher layers, as described in [11, TS 38.321], if any, for corresponding serving cell(s). For beam failure detected SCell(s), after 28 symbols from a last symbol of a PDCCH reception with a DCI format scheduling a PUSCH transmission with a same HARQ process number as for the transmission of the first PUSCH and having a toggled NDI field value, the UE

- monitors PDCCH in all CORESETs on the SCell(s) indicated by the MAC CE using the same antenna port quasi co-location parameters as the ones associated with the corresponding index(es) $q_{new}$, if any
- transmits PUCCH on a PUCCH-SCell using a same spatial domain filter as the one corresponding to $q_{new}$ for periodic CSI-RS or SS/PBCH block reception, as described in Clause 9.2.2, and using a power determined as described in Clause 7.2.1 with $_u = 0$, $_d = q_{new}$, and $l = 0$, if
  - the UE is provided *PUCCH-SpatialRelationInfo* for the PUCCH,
  - a PUCCH with the LRR was either not transmitted or was transmitted on the PCell or the PSCell, and
  - the PUCCH-SCell is included in the SCell(s) indicated by the MAC-CE where the SCS configuration for the 28 symbols is the smallest of the SCS configurations of the active DL BWP for the PDCCH reception and of the active DL BWP(s) of the at least one SCell. For beam failure detected PCell or the PSCell, after 28 symbols from a last symbol of a PDCCH reception with a DCI format scheduling a PUSCH transmission with a same HARQ process number as for the transmission of the first PUSCH and having a toggled NDI field value, the UE

- monitors PDCCH in all CORESETs on the PCell or the PSCell indicated by the MAC CE using the same antenna port quasi co-location parameters as the ones associated with the corresponding index(es) $q_{new}$, if any
- transmits PUCCH on the PCell or the PSCell using a same spatial domain filter as the one corresponding to $q_{new}$ for periodic CSI-RS or SS/PBCH block reception, as described in Clause 9.2.2, and using a power determined as described in Clause 7.2.1 with $q_u = 0$, $_d = q_{new}$, and $l = 0$, if
  - the UE is provided *PUCCH-SpatialRelationInfo* for the PUCCH,
  - a PUCCH with the LRR was either not transmitted or was transmitted on the SCell, and
  - the PCell or the PSCell is included in the serving cell(s) indicated by the MAC-CE where the SCS configuration for the 28 symbols is the smallest of the SCS configurations of the active DL BWP for the PDCCH reception and of the active DL BWP(s) of the at least one serving cell.

FIG. 4

TERMINAL, RADIO COMMUNICATION METHOD, AND BASE STATION FOR BEAM FAILURE RECOVERY (BFR)

TECHNICAL FIELD

The present disclosure relates to a terminal, a radio communication method, and a base station in next-generation mobile communication systems.

BACKGROUND ART

In the universal mobile telecommunications system (UMTS) network, Long Term Evolution (LTE) has been specified for the purpose of further high-speed data rate, low latency, and the like (see Non Patent Literature 1). In addition, LTE-Advanced (third generation partnership project (3GPP) Release (Rel.) 10 to 14) has been specified for the purpose of further larger capacity and advancement of LTE (3GPP Rel. 8 and 9).

Successor systems of LTE (for example, also referred to as 5th generation mobile communication system (5G), 5G+ (plus), 6th generation mobile communication system (6G), New Radio (NR), or 3GPP Rel. 15 or later) are also under study.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In the NR, it has been studied to perform a procedure for a user terminal (user terminal or user equipment (UE)) to detect a beam failure (BF) and switch to another beam (which may also be referred to as a beam failure recovery (BFR) procedure, BFR, and the like).

In Rel. 16 NR, medium access control control element (MAC control element (MAC CE))-based BFR is studied.

In the discussion of Rel. 16 so far, the MAC CE-based BFR has been limited to the usage of recovering the BF of the SCell. Thus, it has been studied to describe the specifications that the PCell or the PSCell should always follow PRACH-based BFR. On the other hand, if MAC CE-based BFR can be used also for the PCell or the PSCell, high-speed BFR can be achieved; thus, and therefore the MAC CE-based BFR is preferable.

However, how to use MAC CE-based BFR for the PCell or the PSCell has not yet been studied. If such a configuration is not specified, BFR cannot be properly used, and a reduction in throughput or a degradation in communication quality may be caused.

Thus, an object of the present disclosure is to provide a terminal, a radio communication method, and a base station that suitably perform a BFR operation in the case where MAC CE-based BFR is introduced.

Solution to Problem

A terminal according to an aspect of the present disclosure includes: a control section that determines beam failure recovery (BFR) to be applied to a cell from physical random access channel (PRACH)-based BFR and medium access control element (MAC CE)-based BFR on the basis of a radio resource control (RRC) parameter regarding MAC CE-based BFR; and a transmitting section that, when a BF is detected in the cell, performs transmission for the determined BFR.

Advantageous Effects of Invention

According to an aspect of the present disclosure, a BFR operation can be suitably performed in the case where MAC CE-based BFR is introduced.

BRIEF DESCRIPTION OF DRAWINGS

FIG. 1 is a diagram showing an example of a beam recovery procedure in Rel. 15 NR.

FIG. 3 is a diagram showing an example of a UE operation specified in which no RRC parameter regarding MAC CE-based BFR is configured.

FIG. 4 is a diagram showing an example of a UE operation specified in which an RRC parameter regarding MAC CE-based BFR is configured.

DESCRIPTION OF EMBODIMENTS (Beam Failure Recovery)

Figure 2:
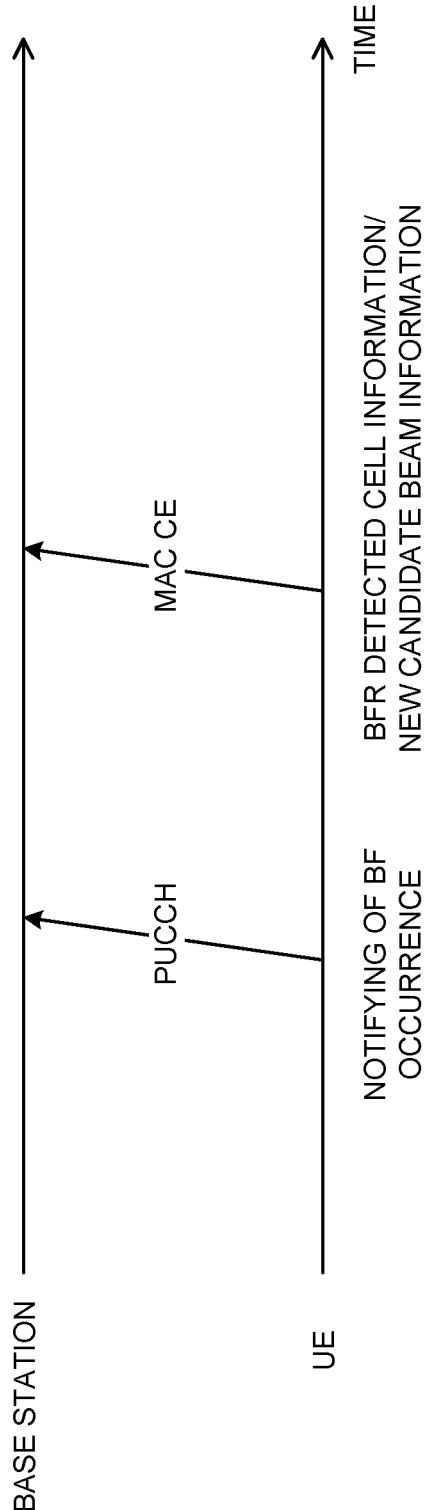
FIG. 2 is a diagram showing an example of a beam recovery procedure in Rel. 16 NR.

In NR, it has been studied to perform a communication using beam forming. For example, a UE and a base station (for example, gNodeB (gNB)) may use a beam used for signal transmission (which is also referred to as a transmission beam, a Tx beam, or the like) or a beam used for signal reception (which is also referred to as a reception beam, an Rx beam, or the like).

In a case where beam forming is used, degradation of radio link quality is assumed because it becomes susceptible to interference by obstacles. A radio link failure (RLF) may frequently occur due to degradation of the radio link quality. When the RLF occurs, cell re-connection is required, and thus frequent occurrence of the RLF leads to degradation of system throughput.

In the NR, to suppress the occurrence of the RLF, it has been studied to perform a procedure of switching to another beam (which may also be referred to as beam recovery (BR), beam failure recovery (BFR), Layer 1/Layer 2 (L1/L2) beam recovery, or the like) in a case where quality of a specific beam degrades. The BFR procedure may be simply referred to as BFR.

Note that a beam failure (BF) in the present disclosure may be referred to as a link failure, a radio link failure (RLF).

FIG. 1 is a diagram illustrating an example of a beam recovery procedure in Rel. 15 NR. The number of beams, or the like, is an example, and is not limited thereto. In an initial state (step S101) in FIG. 1, the UE performs measurement based on a reference signal (RS) resource transmitted using two beams.

The RS may be at least one of a synchronization signal block (SSB) or a channel state information RS (CSI-RS). Note that an SSB may also be referred to as an SS/physical broadcast channel (PBCH) block, or the like.

The RS may be at least one of a primary synchronization signal (primary SS (PSS)), a secondary synchronization signal (secondary SS (SSS)), a mobility reference signal (mobility RS (MRS)), a signal included in an SSB, the SSB, a CSI-RS, a demodulation reference signal (DMRS), a beam-specific signal, or the like, or a signal configured by extending or changing these. The RS measured in step S101 may be referred to as an RS for beam failure detection (beam failure detection RS (BFD-RS)), or the like.

In step S102, interference in radio waves from the base station occurs, whereby the UE cannot detect the BFD-RS (or reception quality of the RS degrades). Such interference may occur due to, for example, an effect of obstacles between the UE and the base station, fading, interference, or the like.

After a given condition is satisfied, the UE detects a beam failure. For example, the UE may detect occurrence of a beam failure in a case where, for all of the configured BFD-RS (BFD-RS resource configurations), a block error rate (BLER) is less than a threshold value. When the occurrence of the beam failure is detected, a lower layer (physical (PHY) layer) of the UE may perform notification (indication) of a beam failure instance to a higher layer (MAC layer).

Note that criteria for determination is not limited to the BLER, and may be reference signal received power in a physical layer (Layer 1 reference signal received power (L1-RSRP)). Further, instead of RS measurement or in addition to RS measurement, beam failure detection may be performed on the basis of a downlink control channel (physical downlink control channel (PDCCH)) or the like. The BFD-RS may be expected to be in a quasi-co-location (QCL) with a DMRS of the PDCCH monitored by the UE.

Here, the QCL is an indicator indicating a statistical property of a channel. For example, in a case where one signal/channel and another signal/channel have a QCL relation, this may mean that it is possible to assume that these multiple different signals/channels have at least one identical property out of a Doppler shift, a Doppler spread, an average delay, a delay spread, or a spatial parameter (for example, spatial Rx filter/parameter, spatial Tx (transmission) filter/parameter) (a QCL relation is established regarding at least one of these).

Note that, the spatial Rx parameter may correspond to a reception beam of the UE (for example, a reception analog beam), and the beam may be specified on the basis of spatial QCL. The QCL (or at least one element of the QCL) in the present disclosure may be replaced with the spatial QCL (sQCL).

Information regarding the BFD-RS (for example, an RS index, resource, number, number of ports, precoding, or the like), information regarding beam failure detection (BFD) (for example, the above-described threshold value), or the like may be configured in (notified to) the UE by using higher layer signaling, or the like. The information regarding the BFD-RS may also be referred to as information regarding a resource for BFR, or the like.

In the present disclosure, higher layer signaling may be, for example, any of radio resource control (RRC) signaling, medium access control (MAC) signaling, broadcast information, and the like, or a combination thereof.

For example, a MAC control element (CE), a MAC protocol data unit (PDU), or the like may be used for the MAC signaling. The broadcast information may be, for example, a master information block (MIB), a system information block (SIB), remaining minimum system information (RMSI), other system information (OSI), and the like.

The MAC layer of the UE may start a given timer (which may also be referred to as a beam failure detection timer) in a case where a beam failure instance notification is received from the PHY layer of the UE. The MAC layer of the UE may trigger BFR (for example, start any one of random access procedures to be described later) after receiving the beam failure instance notification a certain number of times (for example, beamFailureInstanceMaxCount configured by RRC) or more before the timer expires.

The base station may determine that the UE has detected a beam failure in a case where there is no notification from the UE (for example, time for which there is no notification exceeds a given time) or in a case where a given signal (beam recovery request in step S104) is received from the UE.

In step S103, for beam recovery, UE starts a search for a new candidate beam to be newly used for communication. The UE may measure a given RS to select a new candidate beam corresponding to the RS. The RS measured in step S103 may be referred to as a new candidate beam identification RS (NCBI-RS), a CBI-RS, a candidate beam RS (CB-RS), or the like. The NCBI-RS may be the same as or different from the BFD-RS. Note that the new candidate beam may be referred to as a new candidate beam, a candidate beam, or a new beam.

The UE may determine a beam corresponding to an RS that satisfies a given condition as a new candidate beam. The UE may determine a new candidate beam on the basis of, for example, an RS whose L1-RSRP exceeds a threshold value among configured NCBI-RSs. Note that criteria for determination is not limited to L1-RSRP. The determination may be made using at least any one of L1-RSRP, L1-RSRQ, or L1-SINR (signal to noise interference power ratio). L1-RSRP regarding an SSB may also be referred to as SS-RSRP. L1-RSRP regarding a CSI-RS may also be referred to as CSI-RSRP. Similarly, L1-RSRQ regarding an SSB may also be referred to as SS-RSRQ. L1-RSRQ regarding a CSI-RS may also be referred to as CSI-RSRQ. Further, similarly, L1-SINR regarding an SSB may be referred to as SS-SINR. L1-SINR regarding a CSI-RS may be referred to as CSI-SINR.

Information regarding an NCBI-RS (for example, an RS resource, number, number of ports, precoding, or the like), information regarding new candidate beam identification (NCBI) (for example, the above-described threshold value), or the like may be configured in (notified) the UE using higher layer signaling, or the like. The information regarding the NCBI-RS may be acquired on the basis of the information regarding the BFD-RS. The information regarding the NCBI-RS may also be referred to as information regarding a resource for NCBI, or the like.

Note that the BFD-RS, NCBI-RS, or the like may be replaced with a radio link monitoring reference signal (RLM-RS).

In step S104, the UE that has specified the new candidate beam transmits a beam recovery request (Beam Failure Recovery reQuest (BFRQ)). A beam failure recovery request may also be referred to as a beam recovery request signal, a beam failure recovery request signal, or the like.

The BFRQ may be transmitted using, for example, a physical random access channel (PRACH). The BFRQ may include information on the new candidate beam specified in step S103. A resource for the BFRQ may be associated with the new candidate beam. Notification of the information on the beam may be performed using, for example, a beam index (BI), a port index of a given reference signal, a resource index (for example, CSI-RS resource indicator (CRI), SSB resource indicator (SSBRI)), or the like.

In the Rel. 15 NR, contention-based BFR (CB-BFR) that is BFR based on a contention-based random access (RA) procedure and contention-free BFR (CF-BFR) that is BFR based on a non-contention based random access procedure have been supported. In the CB-BFR and the CF-BFR, the UE may transmit a preamble (which is also referred to as an RA preamble, a physical random access channel (PRACH), an RACH preamble, or the like) as the BFRQ by using a PRACH resource.

In step S105, the base station that has detected the BFRQ transmits a response signal (which may also be referred to as a "BFR response", "gNB response" or the like) for the BFRQ from the UE. The response signal may include reconfiguration information (for example, DL-RS resource configuration information) for one or a plurality of beams.

The response signal may be transmitted, for example, in a UE common search space of a PDCCH. Notification of the response signal may be performed using a PDCCH (DCI) with a cyclic redundancy check (CRC) scrambled by an identifier of the UE (for example, a cell-radio RNTI (C-RNTI)). The UE may determine at least one of a transmission beam or a reception beam to be used, on the basis of beam reconfiguration information.

The UE may monitor the response signal on the basis of at least either a control resource set (CORESET) for BFR or a search space set for BFR. For example, the UE may detect the DCI with the CRC scrambled with the C-RNTI in the BFR search space in a CORESET individually configured.

For the CB-BFR, contention resolution may be determined to be successful in a case where the UE receives a PDCCH corresponding to the C-RNTI regarding the UE itself.

Regarding the processing in step S105, a period may be set for the UE to monitor a response from the base station (for example, gNB) for the BFRQ. The period may also be referred to as, for example, a gNB response window, a gNB window, a beam recovery request response window, a BFRQ response window, or the like. The UE may retransmit the BFRQ in a case where no gNB response is detected within the window period.

In step S106, the UE may transmit a message indicating that beam reconfiguration is completed to the base station. The message may be transmitted on the PUCCH or PUSCH, for example.

In step S106, the UE may receive RRC signaling indicating a configuration of a transmission configuration indication (TCI) state used for the PDCCH, or may receive a MAC CE indicating activation of the configuration.

Beam recovery success (BR success) may represent a case where step S106 is reached, for example. On the other hand, beam recovery failure (BR failure) may correspond to, for example, a case where the number of times of BFRQ transmission has reached a given number, or a beam-failure-recovery-timer has expired.

Note that numbers of these steps are merely numbers for description, and a plurality of these steps may be combined, or the order of these steps may be changed. Further, whether or not to perform BFR may be configured in the UE by using higher layer signaling.

(MAC CE-Based BFR)

Meanwhile, in future radio communication systems (for example, Rel. 16 or later), it is studied to, when a beam failure is detected, use an uplink control channel (PUCCH) and MAC control information (MAC CE) to notify the occurrence of the beam failure and report information regarding the cell (or CC) where a beam failure is detected and information regarding a new candidate beam.

For example, it is conceivable that, after detecting a beam failure, the UE uses one or more steps (for example, two steps) to notify the occurrence of the beam failure and report information regarding the cell where a beam failure is detected and information regarding a new candidate beam (see FIG. 2). Note that the reporting operation is not limited to two steps.

A resource can be set more flexibly in a time domain for the uplink control channel as compared with the PRACH. For that reason, it is effective to use the uplink control channel (PUCCH) as a channel to be used for BFRQ transmission. Further, a resource can be set more flexibly in a time domain for the MAC CE (PUSCH) as compared with the PRACH. For that reason, it is also effective to use the MAC CE (PUSCH) as the channel to be used for the BFRQ transmission.

A BFR using reporting using an MAC CE like that shown in FIG. 2 may be referred to as MAC CE-based BFR, two-step BFR, Rel. 16 BFR, etc., or may be referred to as SCell BFR because the usage of recovering a beam failure of a secondary cell (SCell) is assumed.

Note that the BFR of FIG. 1 described above may be referred to as PRACH-based BFR, PRACH-based primary cell (PCell) BFR, Rel. 15 BFR, etc.

In FIG. 2, first, the UE detects the occurrence of a beam failure in a cell (for example, an SCell). This detection may be performed by a method similar to Rel. 15 BFR. In a first step (or step 1), the UE uses an uplink control channel (PUCCH) to notify the occurrence of a beam failure.

The UE that has detected the occurrence of a beam failure searches for a new candidate beam in the cell. It is assumed that, in a second step (or step 2), the UE uses MAC control information (for example, an MAC CE or an MAC PDU including an MAC CE) to report at least one of information regarding the cell where a beam failure is detected and information regarding a new candidate beam.

In the following description, the information transmitted in a first step is also referred to as a first information, and the information transmitted in a second step is as a second information.

For the PUCCH in the first step, a method similar to that for transmission of a scheduling request (SR) may be used. For example, in a BFR procedure, the UE may transmit a first information notifying the occurrence of a beam failure by using an SR. The SR used for notification of the occurrence of a beam failure may be referred to as an SR for BFR, an SR for SCell BFR, a dedicated SR for SCell, a dedicated SR, a link recovery request (LRR), etc.

The MAC CE (or the MAC PDU) in the second step may be transmitted by using an uplink resource. For example, the UE may transmit the MAC CE by using an uplink resource allocated from the base station by the transmission of a PUCCH (for example, a dedicated SR-like PUCCH) in the first step. The MAC CE may be referred to as an MAC CE for BFR.

The uplink resource may be replaced by a resource for a logical uplink channel (for example, a resource for an uplink shared channel (UL-SCH)) (UL-SCH resource), a resource for a physical uplink channel (for example, a physical uplink shared channel), or the like.

The format of the PUCCH used in the first step may be, for example, PUCCH format (PF) 0 or 1. Further, the PUCCH transmission in the first step may be performed in a given cell (for example, a primary cell (PCell) or a primary secondary cell (PSCell)). PF0 may be configured by one or two symbols. On the other hand, PF1 may be configured by four or more symbols.

The PUCCH resource for SCell BFR in the first step may be configured in common to all SCells included in a given group (for example, the same cell group). Further, in the case where the UE detects a beam failure and, before the PUCCH (or SR) transmission in the first step, receives a UL grant in a cell where an MAC CE for BFR can be transmitted, the UE may not perform the PUCCH transmission in the first step.

The MAC CE transmission (PUSCH transmission) in the second step may be performed in the above-mentioned given cell (for example, a PCell or a PSCell).

Even when the UE has detected a beam failure, if the UE cannot specify a new candidate beam, the UE may include, in the MAC CE in the second step, information of the cell where a beam failure is detected, and may not include an index of a new candidate beam. The case where a new candidate beam cannot be specified may be, for example, a case where there is no reference signal having a received power (RSRP) of a given value or more.

In the discussion of Rel. 16 so far, the MAC CE-based BFR has been limited to the usage of recovering the BF of the SCell. Thus, an attempt to state in the specifications that the PCell or the PSCell should always follow PRACH-based BFR has been considered. On the other hand, if MAC CE-based BFR can be used also for the PCell or the PSCell, high-speed BFR can be achieved; thus, this is preferable.

However, how to use MAC CE-based BFR for the PCell or the PSCell has not yet been studied. If such a configuration is not clarified, BFR cannot be properly used, and a reduction in throughput or a degradation in communication quality may be caused.

Thus, the present inventors have conceived a method for suitably performing a BFR operation in the case where MAC CE-based BFR is introduced.

Hereinafter, embodiments according to the present disclosure will be described in detail with reference to the drawings. The radio communication method according to each of the embodiments may be applied independently, or may be applied in combination with others.

In the present disclosure, "A/B" and "at least one of A or B" may be interchangeable.

In the present disclosure, the index, the ID, the indicator, the resource ID, and the like may be replaced with each other.

Note that the special cell (SpCell) in the following description may be replaced with a PCell/PSCell. The SpCell may mean a cell other than the PCell/PSCell.

(Radio Communication Method)

In one embodiment of the present disclosure, the UE determines whether to use PRACH-based BFR or MAC CE-based BFR in an SpCell on the basis of an RRC parameter regarding MAC CE-based BFR.

For example, in the case where no RRC parameter regarding MAC CE-based BFR is configured for an SpCell, the UE may apply PRACH-based BFR to the SpCell.

In the case where an RRC parameter regarding MAC CE-based BFR is configured for an arbitrary cell (which may be either an SpCell or an SCell), the UE may apply MAC CE-based BFR to the cell.

Here, the RRC parameter regarding MAC CE-based BFR may be a parameter regarding at least one of the following:

A threshold for new candidate beam identification (for example, an RRC parameter "rsrp-ThresholdSSBBFR" indicating a range of values of RSRP);

A list of resources for beam failure detection (for example, an RRC parameter "beamFailureDetection-ResourceList" indicating a list of one or more CSI-RS resource IDs);

A dedicated SR for MAC CE-based BFR (for example, an RRC parameter "schedulingRequestIDForBFR" indicating an ID of an SR);

A cell for new candidate beam identification of MAC CE-based BFR (for example, an RRC parameter "cell" indicating a serving cell index (ServCellIndex));

A resource for new candidate beam identification of MAC CE-based BFR (for example, an RRC parameter "candidateBeamResource" indicating at least one of an SSB index, a CSI-RS resource ID, the above "cell", etc.);

A resource list for new candidate beam identification of MAC CE-based BFR (for example, an RRC parameter "candidateBeamResourceList" indicating a list of the above "candidateBeamResource");

The maximum count number of beam failure instances for MAC CE-based BFR beam failure detection (for example, an RRC parameter "beamFailureInstanceMaxCount"); and Enablement of MAC CE-based BFR (for example, an RRC parameter "MACCEbasedBFR").

Note that the "MAC CE-based BFR" in the above description of parameters may be simply replaced with "Rel. 16 NR" (the parameter may not necessarily be a parameter for MAC CE-based BFR, and may be, for example, a parameter used in common with PRACH-based BFR). Further, a suffix such as "-r16" meaning being for Rel. 16 or later may be added to each RRC parameter.

The UE may report, to the network, capability information indicating supporting MAC CE-based BFR for an SpCell. In the case where an RRC parameter regarding MAC CE-based BFR is configured about an SpCell, the UE that has reported the capability information may apply MAC CE-based BFR to the SpCell. The UE that does not report the capability information may apply PRACH-based BFR to an SpCell regardless of whether an RRC parameter regarding MAC CE-based BFR is configured about the SpCell or not.

<Transmission of SR for BFR/MAC CE for BFR>

In MAC CE-based BFR, the SR for BFR/MAC CE for BFR is preferably transmitted in a cell different from the cell where a BF is detected.

Thus, the UE may assume at least one of the following in MAC CE-based BFR:

(1) In regard to BFR of a first cell (BFR for a BF detected in the first cell), an SR for BFR/MAC CE for BFR is transmitted in a second cell (for example, an SCell) different from the first cell (is not transmitted in the SpCell where a BF is detected).

(2) In the case where an SR for BFR is transmitted in a first cell in regard to the BFR of the first cell, resources for a plurality of SRs for BFR (for example, each resource is subjected to time division multiplexing (TDM), assuming a plurality of beams) are configured, and a resource corresponding to a detected new candidate beam is selected from these resources and an SR for BFR is transmitted. Note that a PUCCH corresponding to an SR for BFR may be transmitted by applying a spatial domain filter corresponding to a detected new candidate beam.

(3) In the case where an MAC CE for BFR is transmitted in a first cell in regard to the BFR of the first cell, a PUSCH corresponding to the MAC CE for BFR is transmitted by applying a spatial domain filter corresponding to a detected new candidate beam.

In the above (1), in the case where the beam used is different between a first cell and a second cell, the BFR of the first cell can be properly performed. In the above (2) or (3), MAC CE-based BFR can be properly performed by using a first cell alone.

The PUSCH/PUCCH transmission in the above (2) or (3) to which a spatial domain filter corresponding to a new candidate beam is applied may mean transmission using the same spatial domain filter as the spatial domain reception filter for reception of a reference signal (for example, an SSB or a CSI-RS) used for detection of a new candidate beam.

Note that the UE detects, if the above (2) is followed, a new candidate beam in a first cell after the detection of a first BF and before the transmission of an SR for BFR.

Further, for example, in the case where the first cell is an SpCell, the second cell may be an SCell or another SpCell. In the case where the first cell is an SCell, the second cell may be another SCell or an SpCell.

Note that the first cell and the second cell may belong to different frequency ranges (for example, FR1-FR2 carrier aggregation and FR2-FR1 carrier aggregation may be applied to these cells), or may belong to different bands (for example, inter-band carrier aggregation (inter-band CA) may be applied to these cells).

Examples of Text of Specification

In the case where the operation of the above-described embodiment of the present disclosure is specified as text of a specification, for example, the contents shown in FIG. 3 and FIG. 4 are given. FIG. 3 is a diagram showing an example of a UE operation specified in which no RRC parameter regarding MAC CE-based BFR is configured. FIG. 4 is a diagram showing an example of a UE operation specified in which an RRC parameter regarding MAC CE-based BFR is configured.

The "[Rel. 16 RRC parameter]" in these examples may mean the RRC parameter regarding MAC CE-based BFR described above. Note that it is not necessary for all of these prescriptions to be employed.

In regard to FIG. 3, for example, it is shown that a recovery search space is used for PRACH-based BFR, and thus is used in the case where the UE is not configured with [Rel. 16 RRC parameter]. Further, it is shown that also QCL assumption based on a recovery search space is used in the case where the UE is not configured [Rel. 16 RRC parameter].

In regard to FIG. 4, for example, it is shown that in the case where the UE is configured [Rel. 16 RRC parameter], an MAC CE for BFR is transmitted for a serving cell (not limited to an SCell) of which the radio quality has become worse than the threshold. In the case of the description of FIG. 4, for example, a UE operation that, when a BF occurs in an SpCell, completely performs BFR by interactions of an SCell alone can be achieved. For example, the beams of the PDCCH and the PUCCH of the SpCell can be updated to new beams.

In the case of FIG. 4, for an SCell(s) where a beam failure is detected, the UE may perform the following operation after 28 symbols have elapsed from the last symbol of PDCCH reception for a DCI format that schedules PUSCH transmission having the same HARQ process number as that used for transmission of a first PUSCH transmitting an MAC CE for BFR and that has a new data indicator (NDI) field value to be toggled:

Monitor PDCCHs in all CORESETs of the SCell(s) indicated by the MAC CE by using the same QCL parameter as that of an antenna port regarding index $q_{new}$; and Transmit a PUCCH of a PUCCH-SCell by using the same spatial domain filter as that for CSI-RS/SSB reception regarding index $q_{new}$ (provided that the conditions described in FIG. 4 are satisfied, such as the PUCCH-SCell being included in the SCell(s) indicated by the MAC CE, or an LRR not being transmitted in the PUCCH-SCell).

Note that $q_{new}$ may be an index regarding a new candidate beam (for example, an SSB/CSI-RS) reported by the UE in the BFR procedure. Further, the SCS configuration for the 28 symbols may be the minimum SCS configuration out of the SCS configuration of the active DL BWP for the PDCCH reception and the SCS configuration of the active DL BWP for the SCell(s) where the beam failure is detected.

Further, in the case of FIG. 4, for a PCell or a PSCell where a beam failure is detected, the UE may perform the following operation after 28 symbols have elapsed from the last symbol of PDCCH reception for a DCI format that schedules PUSCH transmission having the same HARQ process number as that used for transmission of a first PUSCH transmitting an MAC CE for BFR and that has a new data indicator (NDI) field value to be toggled:

Monitor PDCCHs in all CORESETs of the PCell or the PSCell indicated by the MAC CE by using the same QCL parameter as that of an antenna port regarding index $q_{new}$; and Transmit a PUCCH of the PCell or the PSCell by using the same spatial domain filter as that for CSI-RS/SSB reception regarding index $q_{new}$ (provided that the conditions described in FIG. 4 are satisfied, such as the PCell or the PSCell being included in the serving cell indicated by the MAC CE, or an LRR not being transmitted in the PCell or the PSCell).

Note that the SCS configuration for the 28 symbols may be the minimum SCS configuration out of the SCS configuration of the active DL BWP for the PDCCH reception and the SCS configuration of the active DL BWP for the serving cell where the beam failure is detected.

According to the one embodiment of the present disclosure described above, whether to apply MAC CE-based BFR or not can be appropriately determined for an arbitrary cell.

(Radio Communication System)

Hereinafter, a configuration of a radio communication system according to one embodiment of the present disclosure will be described. In the radio communication system, communication is performed by using one or a combination of the above-described radio communication methods according to the embodiments of the present disclosure.

Figure 5:
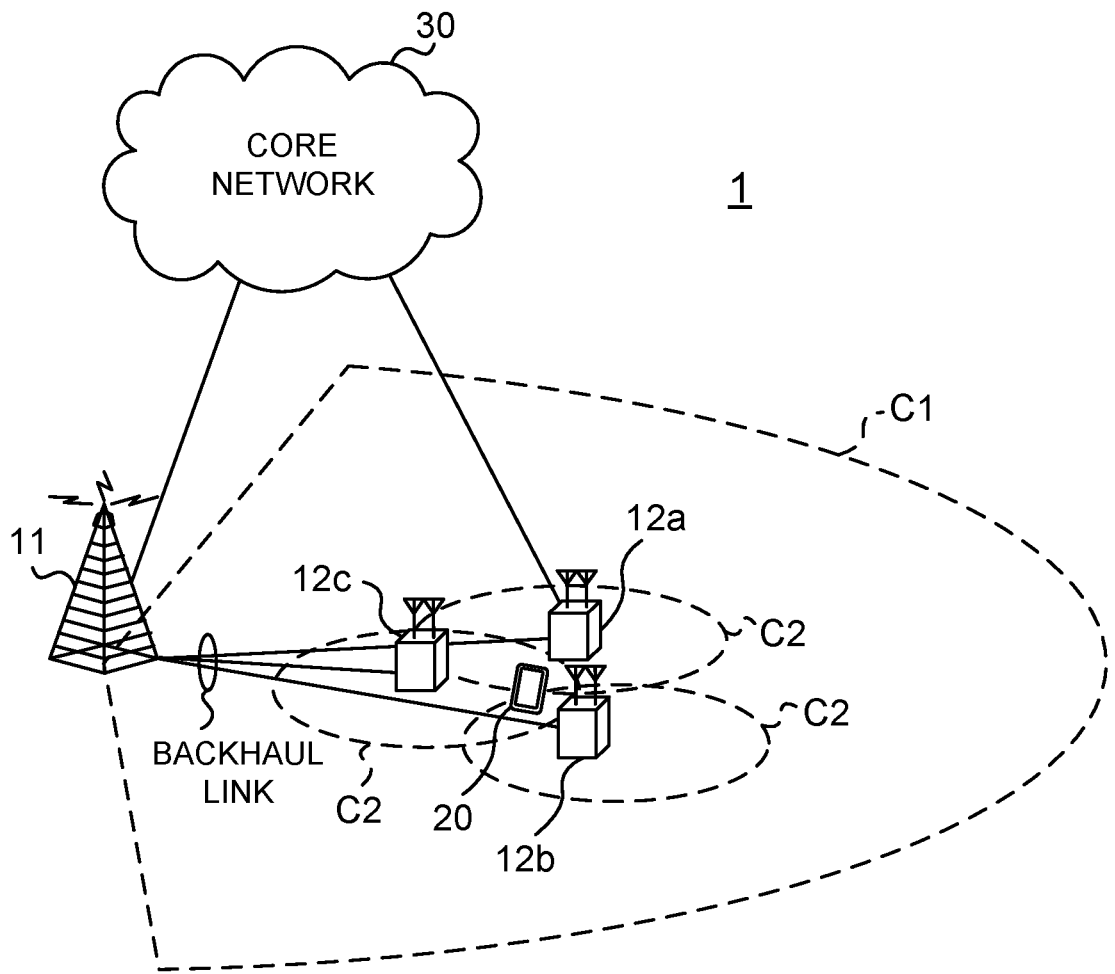
FIG. 5 illustrates one example of a schematic configuration of a radio communication system according to an embodiment.

FIG. 5 is a diagram illustrating an example of a schematic configuration of a radio communication system according to one embodiment. A radio communication system 1 may be a system that implements communication using Long Term Evolution (LTE), 5th generation mobile communication system New Radio (5G NR), and the like specified by Third Generation Partnership Project (3GPP).

Further, the radio communication system 1 may support dual connectivity (multi-RAT dual connectivity (MR-DC)) among a plurality of pieces of radio access technology (RAT). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, the NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC))).

The radio communication system 1 may include a base station 11 that forms a macro cell C1 with a relatively wide coverage, and base stations 12 (12a to 12c) that are disposed in the macro cell C1 and that form a small cell C2 narrower than the macro cell C1. User terminal 20 may be located in at least one cell. The arrangement, number, and the like of cells and the user terminal 20 are not limited to the aspects illustrated in the drawings. The base stations 11 and 12 will be collectively referred to as base stations 10 unless these base stations are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) and a second frequency range (frequency range 2 (FR2)). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and FR1 may correspond to a frequency range higher than FR2, for example.

Further, the user terminal 20 may perform communication in each CC by using at least one of time division duplex (TDD) and frequency division duplex (FDD).

The plurality of base stations 10 may be connected by wire (for example, an optical fiber in compliance with common public radio interface (CPRI) or an X2 interface) or by radio (for example, NR communication). For example, when NR communication is used as backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include at least one of, for example, at least one of evolved packet core (EPC), 5G core network (5GCN), and a next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method and another multi-carrier transmission method) may be used as UL and DL radio access method.

In the radio communication system 1 a downlink shared channel (physical downlink shared channel (PDSCH)) shared by each user terminal 20, a broadcast channel (physical broadcast channel (PBCH)), a downlink control channel (physical downlink control channel (PDCCH)), and the like may be used as a downlink channel.

Further, in the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as an uplink channel.

User data, higher layer control information, and a system information block (SIB), and the like are transmitted by the PDSCH. User data, higher layer control information, and the like may be transmitted on the PUSCH. Further, a Master Information Block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

Note that, the DCI that schedules the PDSCH may be referred to as DL assignment, DL DCI, and the like, and the DCI that schedules the PUSCH may be referred to as UL grant, UL DCI, and the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a certain search space on the basis of search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, and the like), and scheduling request (SR), and the like may be transmitted by the PUCCH. A random access preamble for establishing a connection with a cell may be transmitted by the PRACH.

Note that, in the present disclosure, downlink, uplink, and the like may be expressed without "link". Furthermore, various channels may be expressed without "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including SS (PSS and SSS) and PBCH (and DMRS for PBCH) may be referred to as an SS/PBCH block, an SS block (SSB), and the like. Note that SS, SSB, and the like may also be referred to as a reference signal.

Furthermore, in the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific reference signals)".

(Base Station)

Figure 6:
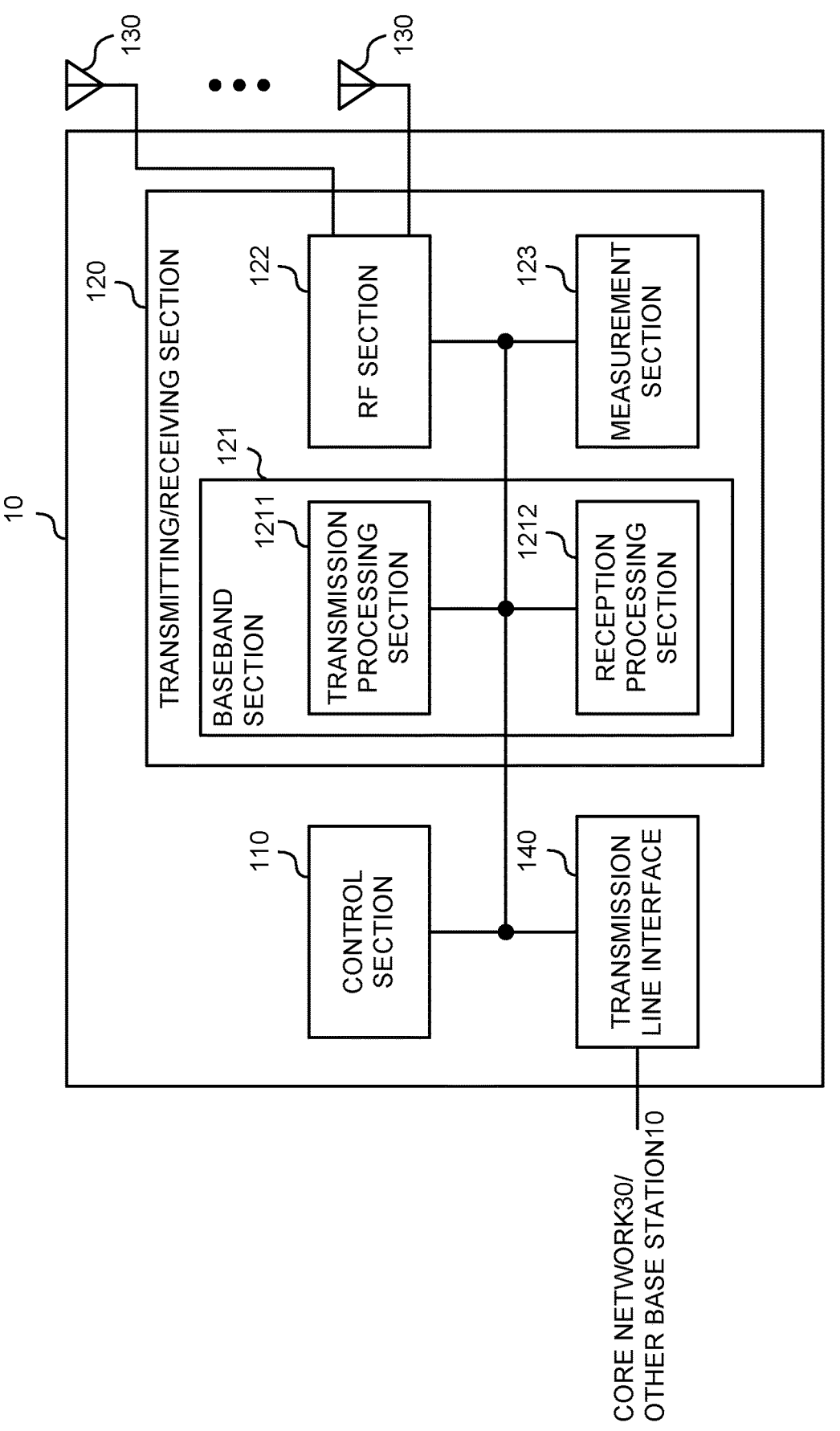
FIG. 6 is a diagram illustrating an example of a configuration of a base station according to an embodiment.

FIG. 6 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, the example mainly describes functional blocks of characteristic parts in the embodiment, and it may be assumed that the base station 10 also includes other functional blocks that are necessary for radio communication. A part of processing of each section described below may be omitted.

The control section 110 controls the entire base station 10. The control section 110 can include a controller, a control circuit, and the like, that are described on the basis of common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or release) of a communication channel, management of the state of the base station 10, management of a radio resource, and the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can include an antenna described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correcting encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency range, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correcting decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like on the basis of the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus, another base stations 10, and the like included in the core network 30, and may perform acquisition, transmission, and the like of user data (user plane data), control plane data, and the like for the user terminal 20.

Note that the transmission section and the receiving section of the base station 10 in the present disclosure may be constituted by at least one of the transmitting/receiving section 120, the transmission/reception antenna 130, and the transmission line interface 140.

Note that the transmitting/receiving section 120 may transmit to the user terminal 20 a radio resource control (RRC) parameter regarding medium access control control element (MAC CE)-based beam failure recovery (BFR).

The control section 110 may assume that the user terminal 20 determines the BFR to be applied to a cell from physical random access channel (PRACH)-based BFR and MAC CE-based BFR on the basis of the RRC parameter.

(User Terminal)

Figure 7:
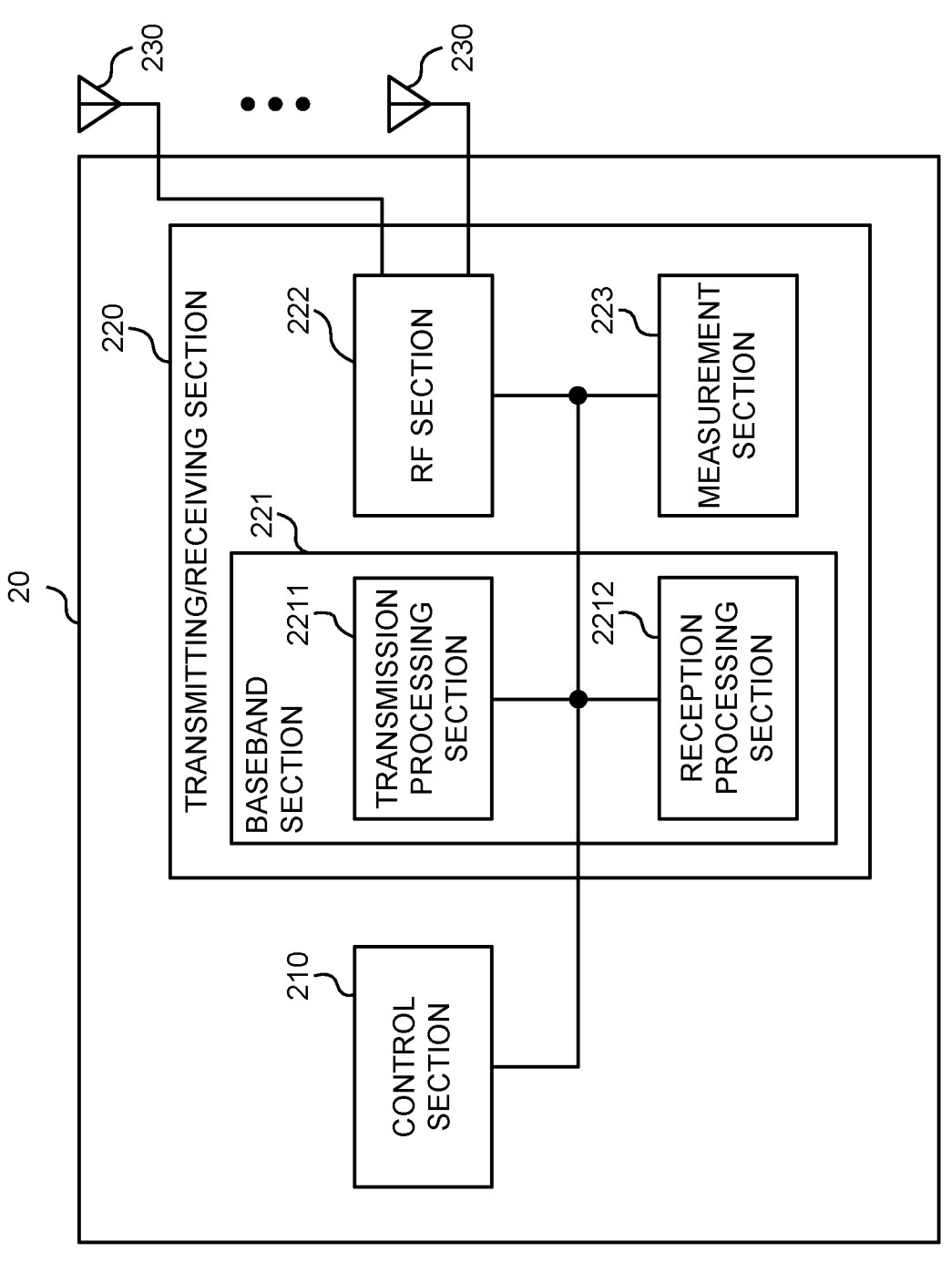
FIG. 7 illustrates one example of the configuration of a user terminal according to an embodiment.

FIG. 7 is a diagram illustrating an example of a configuration of a user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, the example mainly describes functional blocks of characteristic parts in the present embodiment, and it may be assumed that the user terminal 20 also includes other functional blocks necessary for radio communication. A part of processing of each section described below may be omitted.

The control section 210 controls the entire user terminal 20. The control section 210 can include a controller, a control circuit, and the like that are described on basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmitting/receiving circuit, and the like, which are described on the basis of common recognition in the technical field related to the present disclosure.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data or control information acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When it is not the case, DFT processing may not be performed as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmission/reception antenna 230, or the transmission line interface 240.

Note that the control section 210 may determine the beam failure recovery (BFR) to be applied to a cell from random access channel (physical random access channel (PRACH))-based BFR and medium access control control element (MAC CE)-based BFR on the basis of a radio resource control (RRC) parameter regarding MAC CE-based BFR. Here, the cell may be a primary cell, a primary secondary cell, or a secondary cell.

When a BF is detected in the cell, the transmitting/receiving section 220 may perform transmission for the determined BFR. In the case of PRACH-based BFR, the transmission for the BFR may be PRACH transmission for a BFRQ or the like. In the case of MAC CE-based BFR, the transmission for the BFR may be transmission of an SR for BFR/MAC CE for BFR.

The transmitting/receiving section 220 may perform transmission for the BFR in a cell different from the cell.

In the cell, the transmitting/receiving section 220 may perform transmission for the BFR by applying a spatial domain filter corresponding to a detected new candidate beam.

(Hardware Configuration)

Note that the block diagrams that have been used to describe the above embodiments illustrate blocks in functional units. These functional blocks (configuration sections) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (using wires, radio, and the like, for example) and using these plural apparatuses. The functional blocks may be achieved by combining the one apparatus or the plurality of apparatuses with software.

Here, the functions include, but are not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (configuration section) that causes transmission to function may be called as a transmitting unit, a transmitter, and the like. In any case, as described above, the implementation method is not particularly limited.

Figure 8:
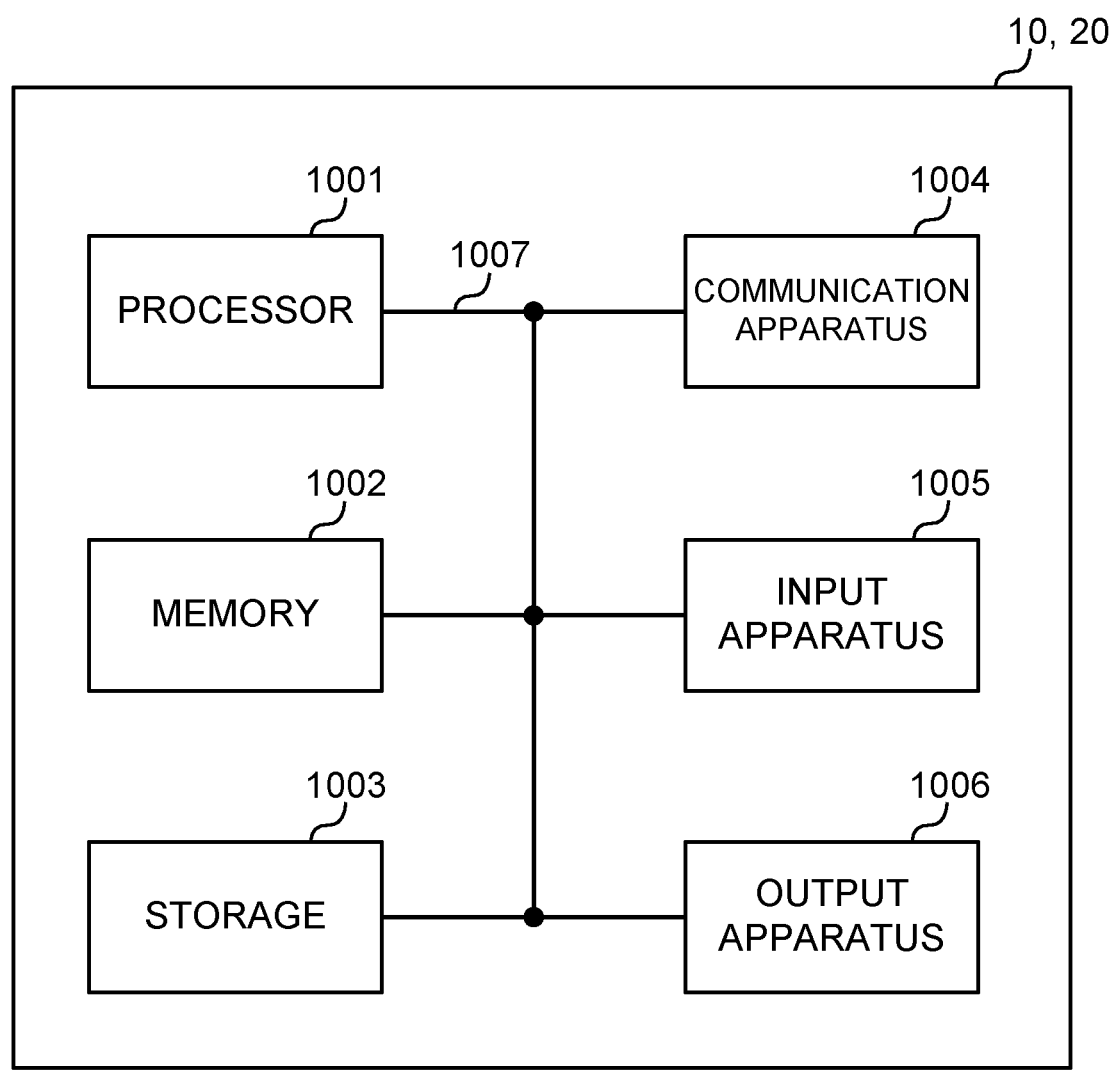
FIG. 8 illustrates one example of a hardware configuration of the base station and the user terminal according to an embodiment.

For example, a base station, a user terminal, and the like according to one embodiment of the present disclosure may function as a computer that executes the processing of the radio communication method in the present disclosure. FIG. 8 is a diagram illustrating an example of a hardware configuration of the base station and the user terminal according to one embodiment. The above-described base station 10 and user terminal 20 may be physically configured as a computer apparatus including a processor 1001, a memory 1002, a storage 1003, a communication apparatus 1004, an input apparatus 1005, an output apparatus 1006, a bus 1007, and the like.

Note that, in the present disclosure, the word such as an apparatus, a circuit, a device, a section, and a unit can be replaced with each other. The hardware configuration of the base station 10 and the user terminal 20 may be designed to include one or a plurality of each apparatuses illustrated in the drawings, or may be designed not to include some apparatuses.

For example, although only one processor 1001 is illustrated, a plurality of processors may be provided. Further, the processing may be executed by one processor, or the processing may be executed simultaneously, in sequence, or in different manners, by two or more processors. Note that the processor 1001 may be implemented with one or more chips.

Each function of the base station 10 and the user terminal 20 is implemented by reading given software (program) on hardware such as the processor 1001 and the memory 1002, and by controlling the operation in the processor 1001, the communication in the communication apparatus 1004, and at least one of the reading and writing of data in the memory 1002 and the storage 1003.

The processor 1001 may control the whole computer by, for example, running an operating system. The processor 1001 may include a central processing unit (CPU) including an interface with peripheral equipment, a control apparatus, an arithmetic apparatus, a register, and the like. For example, at least a part of the above-described control section 110 (210), transmitting/receiving section 120(220), and the like may be implemented by the processor 1001.

Furthermore, the processor 1001 reads, for example, programs (program codes), software modules, or data from at least one of the storage 1003 and the communication apparatus 1004 into the memory 1002, and executes various kinds of processing according to these. As the program, a program to cause a computer to execute at least a part of the operation described in the above-described embodiment is used. For example, the control section 110(210) may be implemented by a control program that is stored in the memory 1002 and operates in the processor 1001, and another functional block may be implemented similarly.

The memory 1002 is a computer-readable recording medium, and may include at least one of, for example, a read only memory (ROM), an erasable programmable rom (EPROM), an electrically EPROM (EEPROM), a random access memory (RAM), and other appropriate storage media. The memory 1002 may be referred to as a register, a cache, a main memory (main storage apparatus), and the like. The memory 1002 can store a program (program code), a software module, and the like, which are executable for implementing the radio communication method according to one embodiment of the present disclosure.

The storage 1003 is a computer-readable recording medium, and may include at least one of, for example, a flexible disk, a floppy (registered trademark) disk, a magneto-optical disk (for example, compact disc (compact disc ROM (CD-ROM) and the like), digital versatile disc, Blu-ray (registered trademark) disk), a removable disk, a hard disk drive, a smart card, a flash memory device (for example, card, stick, and key drive), a magnetic stripe, a database, a server, and other appropriate storage media. The storage 1003 may be referred to as an auxiliary storage apparatus.

The communication apparatus 1004 is hardware (transmitting/receiving device) for performing inter-computer communication via at least one of a wired network or a radio network, and is referred to as, for example, a network device, a network controller, a network card, and a communication module. The communication apparatus 1004 may include a high frequency switch, a duplexer, a filter, a frequency synthesizer, and the like in order to implement at least one of, for example, frequency division duplex (FDD) and time division duplex (TDD). For example, the transmitting/receiving section 120(220), the transmission/reception antenna 130(230), and the like described above may be implemented by the communication apparatus 1004. The transmitting/receiving section 120(220) may be implemented by physically or logically separating a transmitting section 120a(220a) and a receiving section 120b(220b) from each other.

The input apparatus 1005 is an input device that receives an input from outside (for example, a keyboard, a mouse, a microphone, a switch, a button, a sensor, and the like). The output apparatus 1006 is an output device for performing outputting to the outside (for example, a display, a speaker, a light emitting diode (LED) lamp, and the like). Note that the input apparatus 1005 and the output apparatus 1006 may be an integrated configuration (for example, touch panel).

Furthermore, those pieces of apparatuses including the processor 1001, the memory 1002, and the like are connected by the bus 1007 for communicating information. The bus 1007 may be formed with a single bus, or may be formed with buses that vary between apparatuses.

Furthermore, the base station 10 and the user terminal 20 may include hardware such as a microprocessor, a digital signal processor (DSP), an application specific integrated circuit (ASIC), a programmable logic device (PLD), and a field programmable gate array (FPGA), and a part or all of each functional block may be implemented by the hardware. For example, the processor 1001 may be implemented with at least one of these pieces of hardware.

(Variations)

Note that terms described in the present disclosure and terms necessary for understanding the present disclosure may be replaced with other terms that have the same or similar meanings. For example, a channel, a symbol, and a signal (or signaling) may be replaced with each other. Further, the signal may be a message. The reference signal can be abbreviated as an RS, and may be referred to as a pilot, a pilot signal and the like, depending on which standard applies. Further, a component carrier (CC) may be referred to as a cell, a frequency carrier, a carrier frequency, and the like.

A radio frame may include one or more periods (frames) in the time domain. Each of one or a plurality of periods (frames) constituting a radio frame may be referred to as a subframe. Furthermore, a subframe may be constituted by one or a plurality of slots in the time domain. A subframe may be a fixed time duration (for example, 1 ms) that is not dependent on numerology.

Here, the numerology may be a communication parameter applied to at least one of transmission and reception of a signal or a channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

The slot may include one or a plurality of symbols (for example, orthogonal frequency division multiplexing (OFDM) symbol and single carrier frequency division multiple access (SC-FDMA) symbol) in the time domain. Further, the slot may be a time unit based on numerology.

A slot may include a plurality of mini slots. Each mini slot may be constituted by one or a plurality of symbols in the time domain. Further, a mini slot may be referred to as a subslot. Each mini slot may be constituted by fewer symbols than a slot. A PDSCH (or PUSCH) transmitted in a time unit larger than a mini slot may be referred to as PDSCH (PUSCH) mapping type A. A PDSCH (or PUSCH) transmitted using a mini slot may be called PDSCH (PUSCH) mapping type B.

A radio frame, a subframe, a slot, a mini slot, and a symbol all represent the time unit in signal communication. The radio frame, the subframe, the slot, the mini slot, and the symbol may be each called by other applicable names. Note that time units such as a frame, a subframe, a slot, a mini slot, and a symbol in the present disclosure may be replaced with each other.

For example, one subframe may be referred to as TTI. A plurality of consecutive subframes may be referred to as TTI. One slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be called a "slot," a "mini slot", or the like, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of the TTI is not limited thereto.

The TTI may be the transmission time unit of channel-encoded data packets (transport blocks), code blocks, codewords, and the like, or may be the unit of processing in scheduling, link adaptation, and the like. Note that, when TTI is given, a time interval (for example, the number of symbols) in which the transport blocks, the code blocks, the codewords, and the like are actually mapped may be shorter than the TTI.

Note that, when one slot or one mini slot is called a "TTI," one or more TTIs (i.e., one or multiple slots or one or more mini slots) may be the minimum time unit of scheduling. Also, the number of slots (the number of mini slots) to constitute the minimum time unit of scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers in RB may be the same regardless of numerology, and may be 12, for example. The number of subcarriers included in the RB may be determined on the basis of numerology.

Also, an RB may include one or more symbols in the time domain, and may be one slot, one mini slot, one subframe, or one TTI in length. One TTI, one subframe, and the like each may be comprised of one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a given signal/channel outside the active BWP. Note that "cell", "carrier", and the like in the present disclosure may be replaced with "BWP".

Note that the structures of radio frames, subframes, slots, mini slots, symbols and so on described above are merely examples. For example, configurations of the number of subframes in a radio frame, the number of slots per subframe or radio frame, the number of mini slots in a slot, the number of symbols and RBs in a slot or a mini slot, the number of subcarriers in RB, the number of symbols in TTI, a symbol length, a cyclic prefix (CP) length, and the like can be variously changed.

Also, the information, parameters, and the like described in the present disclosure may be represented in absolute values or in relative values with respect to given values, or may be represented using other applicable information. For example, a radio resource may be specified by a given index.

The names used for parameters and the like in the present disclosure are in no respect limiting. Further, a mathematical expression and the like using these parameters may differ from those explicitly disclosed in the present disclosure. Various channels (for example, PUCCH and PDCCH) and information elements can be identified by any suitable name. Various names allocated to these various channels and information elements are in no respect limiting.

The information, signals, and the like described in the present disclosure may be represented using a variety of different techniques. For example, data, instructions, commands, information, signals, bits, symbols, and chips, all of which may be referenced throughout the above description, may be represented by voltages, currents, electromagnetic waves, magnetic fields or particles, optical fields or photons, or any combination of these.

Also, information, signals, and the like can be output in at least one of directions that are from higher layers to lower layers and from lower layers to higher layers. Information, signals, and the like may be input and output via a plurality of network nodes.

The input and/or output information, signals, and the like may be stored in a specific location (for example, in a memory), or may be managed using a management table. The information, signals, and the like to be input and output can be overwritten, updated or appended. The information, signals and the like that are output may be deleted. The input information, signals, and the like may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message and the like. Further, notification of MAC signaling may be performed using, for example, a MAC control element (MAC CE).

Also, notification of given information (for example, notification of information to the effect that "X holds") does not necessarily have to be sent explicitly, and may be sent implicitly (for example, by not reporting the given information, or by reporting another piece of information).

Determination may be made in values represented by one bit (0 or 1), may be made in Boolean values represented by true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and the like.

Further, software, instruction, information, and the like may be transmitted/received via a transmission medium. For example, when software is transmitted from a website, a server, or other remote sources by using at least one of wired technology (coaxial cable, optical fiber cable, twisted-pair cable, digital subscriber line (DSL), and the like) or wireless technology (infrared light, microwave, and the like), at least one of these wired technology and wireless technology is included in the definition of the transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", "component carrier", and the like may be interchangeably used. The base station may be referred to by a term such as a macro cell, a small cell, a femto cell, a pico cell, and the like.

The base station can accommodate one or a plurality of (for example, three) cells. When a base station accommodates a plurality of cells, the entire coverage area of the base station can be partitioned into a plurality of smaller areas. Each smaller area can provide communication service through a base station subsystem (for example, indoor small base station (remote radio head (RRH))). The term "cell" or "sector" refers to a part or the whole of a coverage area of at least one of a base station and a base station subsystem that perform a communication service in this coverage.

In the present disclosure, the terms such as "mobile station (MS)", "user terminal", "user equipment (UE)", and "terminal" can be used interchangeably.

The mobile station may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station or the mobile station may be referred to as a transmitting apparatus, a receiving apparatus, a radio communication apparatus, and the like. Note that at least one of the base station and the mobile station may be a device mounted on a moving object, a moving object itself and the like. The moving object may be a vehicle (for example, a car, an airplane and the like), an unmanned moving object (for example, a drone, an autonomous car, and the like), or a (manned or unmanned) robot. Note that at least one of the base station and the mobile station includes an apparatus that does not necessarily move during a communication operation. For example, at least one of the base station and the mobile station may be Internet of Things (IoT) device such as a sensor.

Further, the base station in the present disclosure may be replaced with user terminal. For example, each aspect/ embodiment of the present disclosure may be applied to a configuration in which communication between the base station and the user terminal is replaced with communication between a plurality of pieces of user terminal (which may be referred to as, for example, device-to-device (D2D) and vehicle-to-everything (V2X)). In this case, the user terminal 20 may be configured to have the functions of the base station 10 described above. Further, the wording such as "uplink" and "downlink" may be replaced with the wording corresponding to the terminal-to-terminal communication (for example, "side"). For example, an uplink channel, a downlink channel, and the like may be interpreted as a side channel.

Likewise, a user terminal in the present disclosure may be interpreted as a base station. In this case, the base station 10 may have the functions of the user terminal 20 described above.

In the present disclosure, the operation performed by the base station may be performed by an upper node thereof in some cases. In a network including one or a plurality of network nodes with a base station, it is clear that various operations performed so as to communicate with a terminal can be performed by a base station, one or more of network nodes (for example, mobility management entity (MME) and serving-gateway (S-GW) may be possible, but are not limiting) other than the base station, or a combination thereof.

The aspects/embodiments described in the present disclosure may be used individually or in combinations, which may be switched depending on the mode of implementation. Further, the order of processing procedures, sequences, flowcharts, and the like of the aspects/embodiments described in the present disclosure may be re-ordered as long as inconsistencies do not arise. For example, although various methods have been shown in the present disclosure with various components of steps using exemplary orders, the specific orders that are shown herein are by no means limiting.

Each aspect/embodiment described in the present disclosure may be applied to a system using long term evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new-radio access technology (New-RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and other appropriate radio communication methods, a next generation system expanded based thereon, and the like. Furthermore, a plurality of systems may be combined to be applied (for example, a combination of LTE or LTE-A and 5G).

The phrase "on the basis of" (or "based on") as used in the present disclosure does not mean "only on the basis of" (or "based only on"), unless otherwise specified. In other words, the phrase "on the basis of" means both "only on the basis of" (or "based only on") and "at least on the basis of" (or "based at least on".)

Reference to elements with designations such as "first," "second", and the like as used in the present disclosure does not generally limit the number/quantity or order of these elements. These designations may be used in the present disclosure as a method convenient in distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be interpreted to mean making judgements and determinations related to judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory), and the like.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, "determining" may be replaced with "assuming", "expecting", "considering", and the like.

The "maximum transmission power" described in the present disclosure may mean a maximum value of transmission power, a nominal maximum transmission power (the nominal UE maximum transmit power), or a rated maximum transmission power (the rated UE maximum transmit power).

As used in the present disclosure, the terms "connected" and "coupled," or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access."

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency domains, microwave domains, and optical (both visible and invisible) domains.

In the present disclosure, the phrase "A and B are different" may mean "A and B are different from each other." Note that the phrase may mean that "A and B are different from C". The terms such as "separated", "coupled", and the like may be similarly interpreted as "different".

When terms such as "include," "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, where translations add articles, such as a, an, and the in English, the present disclosure may include that the noun that follows these articles is in the plural.

Although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Therefore, the description in the present disclosure is provided for the purpose of describing examples, and thus, should by no means be construed to limit the invention according to the present disclosure in any way.

What is claimed is:

1. A terminal comprising:
a processor that,
    if a radio resource control (RRC) parameter indicating enablement of beam failure recovery (BFR) based on a medium access control (MAC) control element (CE) is received, applies the BFR for a primary cell,
    if the RRC parameter indicating enablement of the BFR based on the MAC CE is not received, applies a BFR based on a physical random access channel (PRACH) for the primary cell; and a transmitter that, when a beam failure is detected on the primary cell, performs a transmission for the BFR to be applied,
wherein the terminal is configured to transmit a Physical Uplink Control Channel (PUCCH), on a same primary cell as the PRACH, a certain number of symbols after a last symbol of a Physical Downlink Control Channel (PDCCH); and
the transmitter performs a transmission of capability information indicating that the terminal supports the BFR based on the MAC CE, and
wherein the RRC parameter indicating the enablement of the BFR based on the MAC CE is included in an RRC parameter including an RRC parameter regarding a list for new candidate beam identification.

2. A radio communication method for a terminal, comprising:
applying,
    if a radio resource control (RRC) parameter indicating enablement of beam failure recovery (BFR) based on a medium access control (MAC) control element (CE) is received by the terminal, the BFR for a primary cell,
    if the RRC parameter indicating enablement of the BFR based on the MAC CE is not received by the terminal, a BFR based on a physical random access channel (PRACH) for the primary cell;
when a beam failure is detected on the primary cell, performing a transmission for the BFR to be applied;
transmitting a Physical Uplink Control Channel (PUCCH), on a same primary cell as the PRACH, a certain number of symbols after a last symbol of a Physical Downlink Control Channel (PDCCH); and
transmitting capability information indicating that the terminal supports the BFR based on the MAC CE,
wherein the RRC parameter indicating the enablement of the BFR based on the MAC CE is included in an RRC parameter including an RRC parameter regarding a list for new candidate beam identification.

3. A base station comprising:
a processor that,
    if a radio resource control (RRC) parameter indicating enablement of beam failure recovery (BFR) based on a medium access control (MAC) control element (CE) is transmitted to a terminal, assumes that the terminal applies the BFR for a primary cell,
    if the RRC parameter indicating enablement of the BFR based on the MAC CE is not transmitted to the terminal, assumes that the terminal applies a BFR based on a physical random access channel (PRACH) for the primary cell; and
a receiver that performs a reception for the BFR applied by the terminal,
wherein the receiver receives a Physical Uplink Control Channel (PUCCH), on a same primary cell as the PRACH, a certain number of symbols after a last symbol of a Physical Downlink Control Channel (PDCCH); and
the receiver performs a reception of capability information indicating that the terminal supports the BFR based on the MAC CE,
wherein the RRC parameter indicating the enablement of the BFR based on the MAC CE is included in an RRC parameter including an RRC parameter regarding a list for new candidate beam identification.

4. A system comprising a terminal and a base station, wherein the terminal comprises:

a processor that, if a radio resource control (RRC) parameter indicating enablement of beam failure recovery (BFR) based on a medium access control (MAC) control element (CE) is received, applies the BFR for a primary cell, if the RRC parameter indicating enablement of the BFR based on the MAC CE is not received, applies a BFR based on physical random access channel (PRACH) for the primary cell; and a transmitter that, when a beam failure is detected on the cell, performs a transmission for the BFR to be applied, wherein the terminal is configured to transmit a Physical Uplink Control Channel (PUCCH), on a same primary cell as the PRACH, a certain number of symbols after a last symbol of a Physical Downlink Control Channel (PDCCH); and the transmitter performs a transmission of capability information indicating that the terminal supports the BFR based on the MAC CE, wherein the RRC parameter indicating the enablement of the BFR based on the MAC CE is included in an RRC parameter including an RRC parameter regarding a list for new candidate beam identification, and the base station comprises:

a processor that, if the RRC parameter indicating enablement of the BFR based on the MAC CE is transmitted to the terminal, assumes that the terminal applies the BFR based on the MAC CE for the primary cell;

if the RRC parameter indicating enablement of the BFR based on the MAC CE is not received by the terminal, assumes that the terminal applies the BFR based on the PRACH for the primary cell; and a receiver that performs a reception for the BFR applied by the terminal, and performs a reception of the capability information.

* * * * *